United States Patent
Parkkinen et al.

(10) Patent No.: US 10,909,351 B2
(45) Date of Patent: Feb. 2, 2021

(54) METHOD OF IMPROVING IMAGE ANALYSIS

(71) Applicant: Revieve Oy, Helsinki (FI)

(72) Inventors: Sampo Parkkinen, Vantaa (FI); Samuli Siivinen, Valencia (FI); Jakke Kulovesi, Helsinki (FI)

(73) Assignee: Revieve Oy, Helsinki (FI)

(*) Notice: Subject to any disclaimer, the term of this patent is extended or adjusted under 35 U.S.C. 154(b) by 0 days.

(21) Appl. No.: 16/408,682

(22) Filed: May 10, 2019

(65) Prior Publication Data

US 2019/0347469 A1 Nov. 14, 2019

Related U.S. Application Data

(60) Provisional application No. 62/670,982, filed on May 14, 2018.

(51) Int. Cl.
*G06N 20/00* (2019.01)
*G06K 9/00* (2006.01)
*G06T 7/00* (2017.01)

(52) U.S. Cl.
CPC ..... *G06K 9/00228* (2013.01); *G06K 9/00288* (2013.01); *G06N 20/00* (2019.01); *G06T 7/0002* (2013.01); *G06T 2207/20081* (2013.01); *G06T 2207/30201* (2013.01)

(58) Field of Classification Search
CPC ............ G06K 9/00228; G06K 9/00248; G06T 2207/30088; G06T 7/73; G06T 7/0002; G06N 20/00
See application file for complete search history.

(56) References Cited

U.S. PATENT DOCUMENTS

2016/0125228 A1* 5/2016 Son .......................... G06T 7/90
382/118
2017/0178220 A1* 6/2017 Chong ............... G06K 9/00268

* cited by examiner

*Primary Examiner* — Sam Bhattacharya
(74) *Attorney, Agent, or Firm* — Ziegler IP Law Group, LLC

(57) ABSTRACT

A method of determining facial areas from an image of a face of a user. The method includes obtaining, using a processing device, a set of image analysis modules. Further, the method includes receiving, using a communication device, the image of the face of the user. Yet further, the method includes receiving, using a communication device, an indication of a facial area of interest from the user. Moreover, the method includes selecting, using a processing device, from the set of image analysis modules an image analysis module associated with the indicated facial area of interest. Further, the method includes analyzing, using a processing device, the image of the face of the user to locate the indicated facial area of interest using the selected image analysis module. Yet further, the method includes rendering, using a processing device, in a user interface the image of the face of the user with an indication of the found facial area. Moreover, the method includes receiving, using a communication device, a feedback with the user interface if the found facial area is indicated properly. Further, the method includes updating, using a processing device, the image analysis module based on the received feedback.

5 Claims, 6 Drawing Sheets

(A) forehead,
(B) glabella,
(C) temporal region,
(D) lateral canthal area,
(E) infraorbital area,
(F) cheeks
(G) nasolabial folds
(H) marionette lines,
(I) perioral Lines
(J) lips,
(K) oral commissures,
(L) jawline,
(M) chin,
(N) eye lashes.

METHOD OF IMPROVING IMAGE ANALYSIS

TECHNICAL FIELD

The aspects of the disclosed embodiments pertain in general to the field of image analysis, and especially to proposing appropriate skin care product to a user based on image analysis.

BACKGROUND

The skin care product market is huge across the world. Several brands offer a range of skin care products. Therefore, hundreds of different skin care products and other cosmetics are available in the market. The skin care products market size is projected to reach USD 196.67 billion by 2024, according to a report by Grand View Research, Inc.

Accordingly, some existing systems recommend cosmetic products to users and also allow users to test cosmetic products virtually. For example, such systems, augment image of a face of a user based on a selected cosmetic product to reflect the changes the selected cosmetic product would bring to a specific facial area of the user if the selected cosmetic product is applied on the specific facial area of the user in the real world.

However, it is challenging to determine specific facial areas and related parameters automatically. Often, the automatically identified facial areas do not match with the requirements of the user. Further, the existing systems do not allow users to provide feedback regarding the automatically identified facial areas and the parameters.

Therefore, in light of the foregoing discussion, there exists a need to overcome the aforementioned drawbacks.

SUMMARY

According to one aspect, the present disclosure provides a method of determining parameters related to facial areas from an image of a face of a user. The method includes obtaining, using a processing device, a set of image analysis modules, wherein each of the image analysis modules is trained to analyses different facial areas. Further, the method includes receiving, from a communication device, the image of the face of the user. Yet further, the method includes receiving, from a communication device, an indication of a facial area of interest from the user. Moreover, the method includes selecting, using a processing device, from the set of image analysis modules an image analysis module associated with the indicated facial area of interest. Further, the method includes analyzing, using a processing device, the image of the face of the user to derive a parameter related to the indicated facial area of interest using the selected image analysis module. Yet further, the method includes rendering in a user interface of a communication device the image of the face of the user with an indication of the derived parameter. Moreover, the method includes receiving, from a communication device, a feedback with the user interface if the derived parameter is indicated properly. Further, the method includes updating, using a processing device, the image analysis module based on the received feedback.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
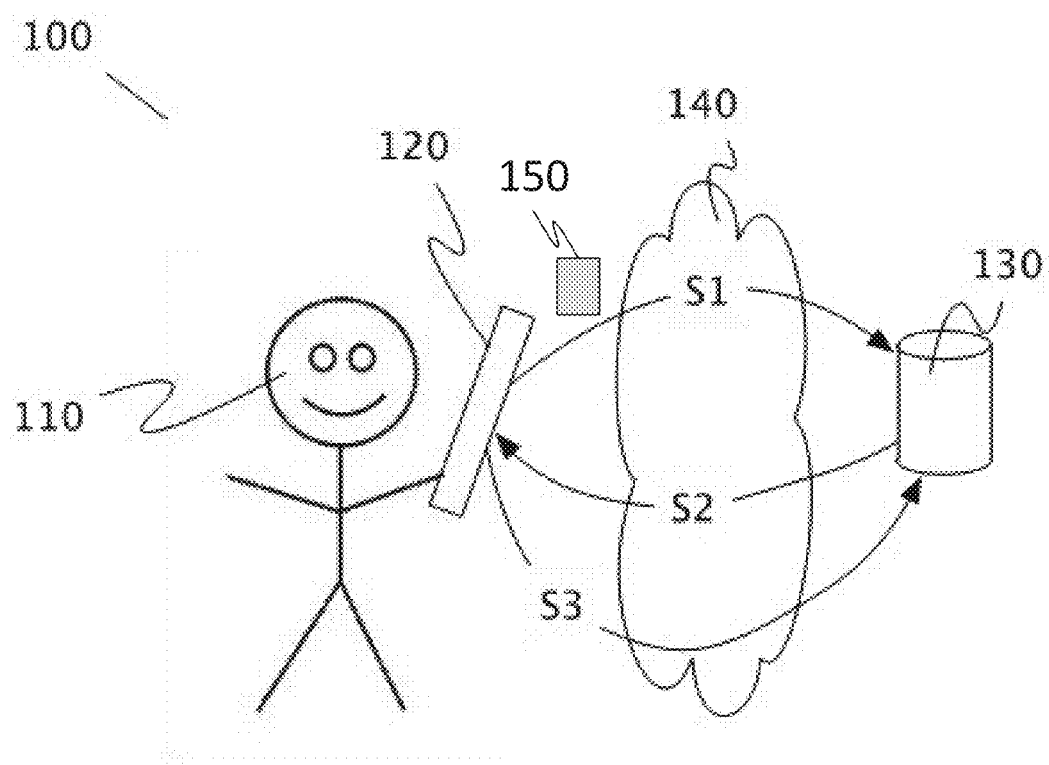
FIG. 1 is an illustration of an online platform consistent with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

According to some embodiments, the present disclosure provides a method of determining parameters related to facial areas from an image of a face of a user. The method can be partially implemented with a processing device such as an online platform. The online platform may be hosted on a centralized server, such as, for example, a cloud computing service. The centralized server may communicate with other network entities, such as, for example, a communication device (mobile device, a smartphone, a laptop, a tablet computer etc.), servers (such as servers hosting social networking websites, blogs, forums etc.), and a database over a communication network, such as, but not limited to, the Internet. Further, users of the online platform may include relevant parties such as, but not limited to, users, businesses, skin care product manufacturers, system administrators and so on. Accordingly, in some instances, electronic devices operated by the one or more relevant parties may be in communication with the online platform.

A user, such as the one or more relevant parties, may access the online platform through a web-based software application or browser. The web-based software application may be embodied as, for example, but not be limited to, a website, a web application, a desktop application, and a mobile application.

According to some embodiments, the present disclosure provides a method of determining parameters related to facial areas from an image of a face of a user. The method includes obtaining, using a processing device, a set of image analysis modules, wherein each of the image analysis modules is trained to analyze different facial areas. For example, the different facial areas include one or more of forehead, glabella, temporal region, lateral canthal region, infraorbital area, cheeks, nasolabial folds, marionette lines, perioral lines, lips, oral commissures, jawline, chin and eye lashes. For example, the set of image analysis modules may include a cheek-recognition image module trained to detect the cheeks in an image of a face of a user. Further the set of image analysis modules may include color detection of eyes.

In some embodiments, the image analysis modules in the set of image analysis modules, may comprise artificial intelligence algorithms. For example, the artificial intelligence algorithms may include one or more of a 3-D recognition algorithm and a skin texture analysis algorithm. For example, the 3-D recognition algorithm may process two or more images of a user's face captured from different viewing angles to generate a 3D model of the face, which may be then used to derive parameters related to facial areas in an image of a face of a user. Further, the skin texture analysis algorithm may be configured to capture an image of a patch of skin of a user's face. Further, the skin texture analysis algorithm may split the patch of skin into smaller blocks. Yet further, the skin texture analysis algorithm may turn the smaller blocks into a mathematical, measurable space/model to determine and distinguish any lines, pores and the actual skin texture. The mathematical, measurable model may be then used to locate facial areas in an image of a face of a user.

In some embodiments, the image analysis modules in the set of image analysis modules, may include machine learning classifiers trained using one or more training sets. For example, the one or more training sets may include multiple images from different angles of a face of a single person. Further, the machine learning classifiers may be trained using the one or more training sets to identify and classify one or more facial areas. Accordingly, the machine learning classifiers may automatically analyze and classify one or more facial areas in a new image provided by a user to derive parameters related to the facial areas.

In some embodiments, an image analysis module in the set of image analysis modules trained to analyze a specific facial area is tuned-up using a training set corresponding to the specific facial area.

Further, the method includes receiving, from a communication device, the image of the face of the user. The image of the face of the user may be provided by the user. As an example, the user can use a communication device (smart phone) to take a selfie (i.e. picture of herself) and send that to the processing device (on-line service). In some embodiments, the user may take one or more images and select a particular image, for example, a best quality image of the user's face. Optionally metadata related to the image such as exposure, camera model and make, objective, used lens, exposure time, optical aperture, ISO number etc. can be provided when the image is created and provided to the processing device for analysis purposes.

After the best quality face image has been found, the image will be normalized to remove variation in the image. The normalization consists of luminance manipulations and geometrical transformations. In addition, several error conditions are detected and responded to at this stage.

Firstly, the image is rotated so that eye center points are horizontal. Secondly, the face area is cropped based on the extrema of facial landmark points. Third, the cropped area image resolution is standardized so that the face area width corresponds to a fixed constant. Resolution is changed via linear interpolation.

Figure 2:
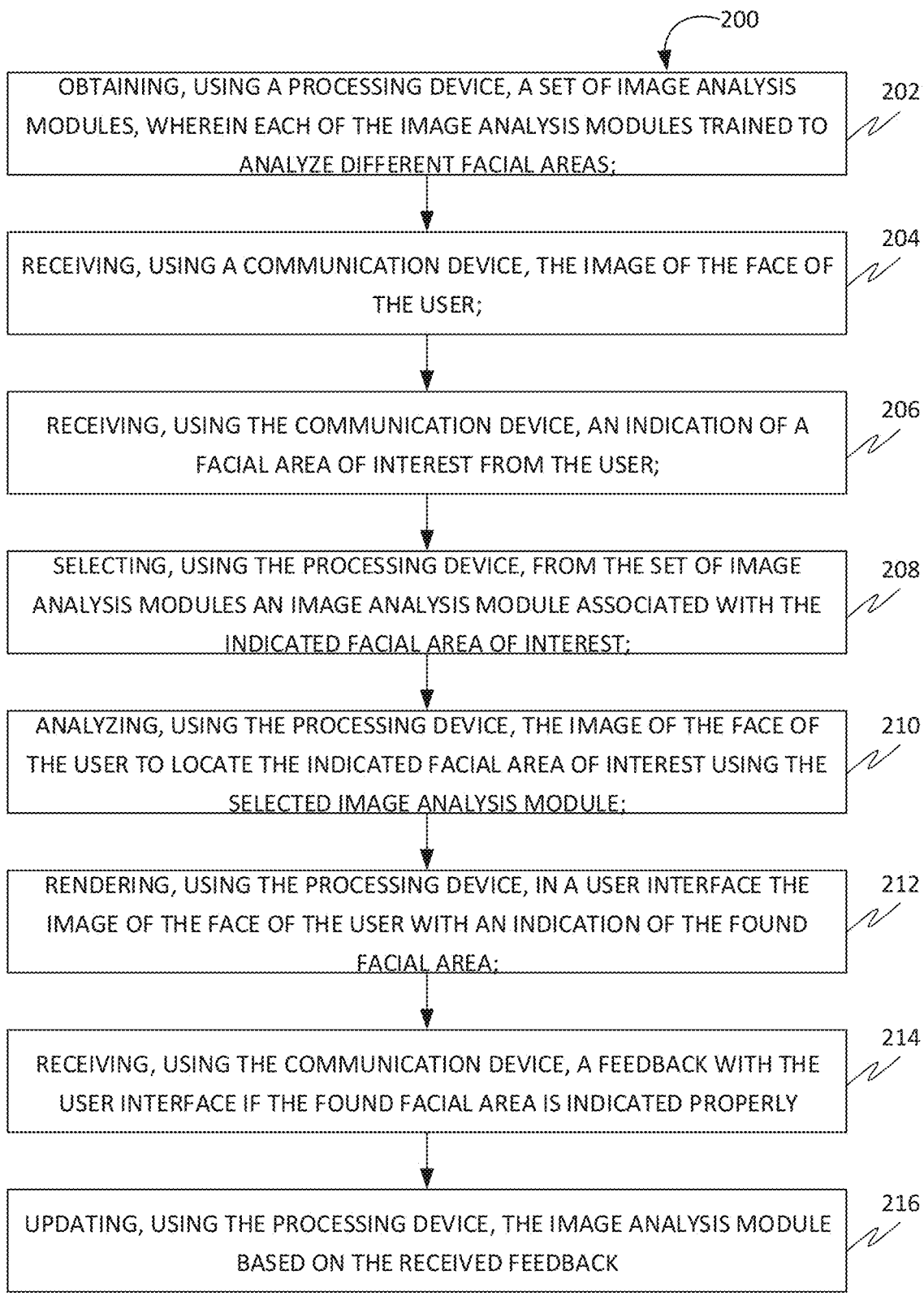
FIG. 2 is a flowchart for a method of determining facial areas from an image of a face of a user in accordance with some embodiments.

Luminance normalization attempts to minimize the effects of varying illumination, exposure, and other imaging variance sources. First, sRGB color space from the original image is converted into Lab color space (Or, CIELAB). Lab color space splits the image information into luminance (L) and two chroma/color channels (a, b). FIG. 2 below illustrates the "a" and "b" color primaries. "A" color axis corresponds roughly to red (+) vs. cyan green (−). "B" color axis corresponds roughly to orange (+) vs. blue (−).

Next, the luminance channel is linearized with the use of a heuristic look-up table. Digital image sensors capture and record light in a linear form but later in the image processing pipeline, the values are gamma converted in order to more accurately and efficiently work with the human perceptual system and usual display devices. However, gamma-converted luminance data is difficult to manipulate after the non-linearity is introduced. An additional difficulty is that imaging devices actually apply a complicated and device-dependent nonlinear transform to the linear raw data. Technically, this transform is impossible to invert without detailed information from each separate imaging device and their parameters. A practical compromise is to use a heuristic profile that works acceptably in average. Such nonlinear conversion has been estimated and is then used to approximately invert the nonlinear mappings. The result is an approximately linear luminance channel.

After linearization, the image exposure (luminance intensity) can be normalized with simple multiplication. The central facial area is sampled for illumination intensity and is then normalized into sRGB vs. Lab colors a fixed value. Additionally, contrast of the image is normalized as follows: central face area is sampled for absolute difference between the normalized luminance values and the mean luminance value. The sample mean works as a measure of contrast. This contrast measure is normalized to a set value around the mean luminance. Additionally, a nonlinear mapping is applied to the luminance values to limit the extreme values smoothly. A hyperbolic tangent function is used in the nonlinear mapping. With simple addition and multiplication, the final normalized luminance output scale is set to range (0.1). Further, the method includes receiving, from the communication device, an indication of a facial area of interest from the user. For an instance, the user may be provided a list of facial areas on her user device. Then, the user may provide the indication of the facial area of interest by selecting the facial area of interest from the list of facial areas. Alternatively, the user may use voice recognition technology to provide the indication of a facial area of interest. For example, the user may speak "locate cheeks" into the microphone her user device. Accordingly, the cheeks may be received as the indication of a facial area of interest from the user.

In some embodiments, the indication of a facial area of interest includes an area selected by the user on the image of the face of the user.

The facial areas of interest are broken down to masks. Masks refer to specific and standardized regions of the face that are used for particular analysis methods. More technically, a mask is a binary image of the same size with the accompanying image that determines for every pixel if it belongs to that area of interest or not. Masks are used to sample facial locations so that analysis is more accurate, robust, and reliable. Thus, unreliable areas are best left out of the masks, putting more emphasis on the central and essential locations. For example, wrinkle analysis uses masks from the very key areas of the face where the particular wrinkles are most prominent.

All mask generation is based on the normalized image of the face and the associated facial landmark positions. Therefore, the masks are always tuned individually to each face. Since there is a limited number of landmarks detected, many masks have to rely on indirect use of several landmarks in order to locate facial positions not near a ready-detected landmark. In addition, to limit the detrimental effect of noise in the landmark locations, the weaker landmark features are controlled by using more robust landmarks as control checks. For example, jawline landmarks are a relative weakness in the landmark detection algorithm, often going too wide from a side (making the face seem wider than it is). This is controlled by using the outer eyebrow extrema as a conservative limit for the face width. Other such techniques are implemented to improve the mask location estimation reliability.

Details on the generated masks are presented in the context of their connected analysis methods.

Further, the method includes selecting, using the processing device, from the set of image analysis modules an image analysis module associated with the indicated facial area of interest. For example, the indicated facial area of interest is cheeks, then the cheek-recognition image module may be selected.

Further, the method includes analyzing, using the processing device, the image of the face of the user to derive a parameter related to the indicated facial area of interest using the selected image analysis module. For example, the selected cheek-recognition image module may analyze the image of the face of the user to locate the cheeks in the image. Additional parameters which can be derived (in addition to location i.e. to locate the cheeks) can be color of a facial area (such as eye color), color of lips, form factor of cheeks etc.

In one method, in order to derive a specific parameter related to an indicated facial area of interest, specific targeted algorithms for deriving a specific parameter (e.g. crow's feet or marionette line wrinkles) are deployed. The deployed specific targeted algorithms are run against a representative set of images for that specific parameter and facial area of interest. The results of the representative set of images for a specific parameter related to a particular indicated facial area of interest form a distribution of values (e.g. values for marionette lines from 0.01 to 0.99). Each new analyzed image analyzed through a processing device is added to the distribution and mapped against the existing distribution of values to derive a value for a specific parameter.

Each facial point of interest is further analyzed using expert algorithms specifically fine-tuned to detect a distinct facial feature. For example, the analysis of wrinkles is conducted as follows:

Wrinkle analysis targets specific areas of the face separately. For each area, the wrinkling process is different and the analysis is tuned for the location. The areas and wrinkle types analyzed are the following: forehead worry lines, frown lines between the brows, bunny lines at the nose bridge, crow's feet at the outer sides of the eyes, and tear line wrinkles below eyes. For each location, a tightly fitted mask is generated to define the analysis area. These masks are made smaller than maximally possible to make them more robust and as such, do not try to cover the entire wrinkle-prone area. Thus, the masks define a sampling area to measure a wrinkling type. If a mask should fall outside its skin area, errors to the measurement are introduced since the wrinkle analysis is naturally sensitive to edges. Two scores are defined for wrinkles: a general wrinkle measure that simply evaluates how much there are wrinkles and how strong are they. The second score is called wrinkle intensity and it is the estimated maximum depth (or intensity) of the wrinkles in the area. The most essential difference between the measures is that the general score averages the amount and intensity of all wrinkles in the area whereas the specific intensity score is sensitive to the detected dominant wrinkle only.

The wrinkles are searched with filtering techniques that operate on one orientation at a time. There are in total eight orientation that cover all line directions from horizontal to vertical and between. Each mask area is associated with relevant directions only. Thus, for example, worry lines are only estimated from horizontal and near-horizontal orientations. This reduced noise and makes the analysis more efficient. Regardless, it is important to have no obstructions on the relevant skin areas. Eyeglasses or hair for example result in false edges that cannot be separated from the true wrinkle-caused edges. The core of the wrinkle analysis algorithm is a cascade of filters and operations. This cascade is performed once for each location and orientation. First, image data is prepared by rotating the cropped L channel (Lab color space) image data to the selected orientation. The mask for the area-to-be analyzed is rotated similarly. After rotation, the following stages are applied: 1) perpendicular high-pass filtering 2) mid-lowpass filtering 3) nonlinear continuity filtering 4) local minima extraction. All stages utilize the masked filtering method that is immune to edge effects. The following describes the stages in more detail.

1) The algorithm focuses on finding continuous dark stripes (wrinkles) that are perpendicular to the chosen rotation. In other words, a normally oriented (face up) image would be used to detect vertical wrinkles. The first stage applies a simple high-pass filter horizontally. A low-passed image is reduced from the original to result into the high-passed image.

2) Noise suppression filter is used to low-pass the image in both horizontal and vertical orientations with Gaussian kernels. These kernels have a limited radius to reach the best compromise between loosing detail and erasing high frequency noise in the image.

3) Another image difference is calculated by using a stronger vertical Gaussian filter. This image is reduced from the stage 2 result. The outcome can be interpreted as the magnitude of local vertical luminance variation. This difference is dilated with the morphological operation to expand the bright regions vertically. The logic here is that a wrinkle should be rather continuous linear feature. The stage 2 result is added with twice the value of the dilated image. The dilated image works as a penalty against variability since the bright areas are expanded and wrinkles are dark, reducing weight of areas with varying intensities. Without this non-linearity, a series of blobs would trigger the algorithm. Now, series of blobs are suppressed but smooth linear features are preserved.

4) The approach here is that only locally dominant (strongest) wrinkles are analyzed while all data in between in ignored. More importantly, every wrinkle is reduced to single pixel width in the analysis and the intensity of that pixel determines the wrinkle intensity. These operations normalize against a lot of harmful variation in the wrinkles. A wide but shallow wrinkle would otherwise dominate over a deep but a narrow one. Now, the wrinkles are reduced normalized to single dimension to eliminate these complications. Technically, the image is subject to horizontal local minima search that can be performed by eroding the source image and asserting that the eroded image and the original should be equal if and only if the location is a local minimum. The local minima values are sampled from the stage 3 result and the rest of the data is set to zero. Additionally, all non-negative values are set to zero (only true negative local minima count). This result image is raised to the second power to emphasize bigger values over small ones (and additionally, positive scores now represent dark areas since negative values to the second power turn positive). Additional maximum intensity is enforced to avoid super strong outlier values from dominating the wrinkle measure. Data without this maximum ceiling is recorded for use with the intensity measure. Finally, a low-passed version of the data is calculated for the next stage.

After these stages, the processed image data is inverse rotated back to the original orientation. All the orientations that are flagged for the current location are similarly processed. The directions are combined so that only the locally largest of the orientation findings is present in the final image. The dominant direction among the orientations can be found by comparing the low-passed data: the largest value from the low-passed orientation matrices is selected for all pixel locations in the mask area. That identity (which orientation) is then used for indexing the non-low-passed data to construct the final result matrix. The natural logarithm of the mask area mean is the raw measure score. Logarithm is taken since the nature of the wrinkle algorithm results in a very unsymmetrical distribution of values (estimated from the reference data set). The logarithm corrects the shape of the distribution to be more uniform, improving the statistics of the measure.

The intensity measure is calculated similarly from the non-maximum limited version but with by percentile analysis of value distribution and selecting the set top value from that distribution. This is more robust than to simply select the absolute largest value.

The raw values are normalized with the four-parameter hyperbolic tangent function using parameters that are tuned for the specific location analyzed and to obtain close to uniform distributions for the reference data set.

The aggregate wrinkle score is calculated as the mean of the normalized general wrinkle scores. An aggregate score for the wrinkle intensity is not defined—that measure is only present locally for each wrinkle analysis area.

This method of analysis surprisingly decreases the processing time and power of deriving specific parameters for related indicated facial areas of interest by breaking down the problem of facial parameter analysis deploying dozens of specifically targeted algorithms simultaneously.

Further, the method includes rendering in a user interface of the communication device the image of the face of the user with an indication of the derived parameter. For an instance, the user interface may overlay a graphic element (such as a circle) on the image of the face of the user to indicate the found facial area. For example, if the user selects cheeks as the facial area of interest, then the cheeks in the image of the face of the user may be highlighted with the graphic element, such as a circle graphic element that may enclose the cheeks. In other example color of the eyes can be rendered i.e. stating for example that based on analysis your eye color is blue.

Further, the method includes receiving, using the communication device, a feedback with the user interface if the derived is indicated properly.

In some embodiments, the feedback may include the user modifying the derived parameter on the user interface. For example, the circle graphic element may highlight the found facial area (the cheeks) at an incorrect location from the user's perspective. Therefore, the user may modify the location of the graphic element on the user interface to indicate the correct location of cheeks according to the user's perspective. For example, the user may select the graphic element overlaid on the cheeks by touching the touchscreen of her smartphone and then may drag the graphic element to a correct location according to the user's perspective. Further the user might correct proposed color eyes or for example hair.

Further, the method includes updating, using the processing device, the image analysis module based on the received feedback. For example, the cheek-recognition image module may be updated based on the correct location of the cheeks indicated by the user. As an other indicator the color-recognition module could be updated based on the feedback. When updating the modules metadata associated with the image received from the user can be taken in consideration. This enables to enhance algorithms to take in account used camera settings and make.

In some embodiments, updating the image analysis module based on the received feedback includes retraining the image analysis module based on the received feedback.

According to further embodiments, the present disclosure provides a method of recommending one or more cosmetic products. The method may include proposing one or more cosmetic products for the selected facial area. In some embodiments, the one or more cosmetic products are proposed based on one or more of a profile of the user, product reviews of one or more cosmetic products received from other users having a similar face as the user. The product reviews of one or more cosmetic products may be received from social networking websites, blogs, forums etc.

According to further embodiments, the method may include recording user data. For an instance, the user data may include the facial area of interest, facial features of the user, one or more cosmetic products purchased by the user. For example, the online platform may store a first user's facial features as well as details about the one or more cosmetic products purchased by the first user. Accordingly, when a second user with similar facial features as of the first user is detected, then the online platform may recommend the one or more cosmetic products purchased by the first user to the second user.

Further, the method may include augmenting the image of the face of the user based on the one or more cosmetic products. For example, the augmenting the image of the face of the user may include modifying one or more image parameters of the facial area of interest based on the one or more cosmetic products. For example, the one or more image parameters of the facial area of interest may include tone, hue, lightness, brightness, contrast, chroma, colorfulness and saturation. Further, a proposed cosmetic product may be a pink blush for the cheek area. Accordingly, the augmenting the image of the face of the user may include modifying the one or more image parameters of the cheek area based on the cosmetic product pink blush. Specifically, the color parameter of the cheek area may be modified to reflect a pinkish shade.

Further, the method may include rendering the augmented image in the user interface. Accordingly, the user may view the augmented image of the face of the user with the one or more cosmetic product applied on the image of the face of the user.

According to further embodiments, the present disclosure provides a method of enhancing the image of the face of the user. The method may include analyzing the image of the face of the user provided by the user. The analyzing may include identifying one or more issues with the image. For example, the user may click an image using a smartphone camera, wherein the smartphone camera may be in between the user and the light source, such as the sun. Accordingly, the image captured may be overexposed. Therefore, the analyzing may identify the overexposed image.

Further, the method may include normalizing colors of the image of the face of the user based on the analyzing. The normalizing colors may further include detecting illumination conditions in the image of the face of the user. Accordingly, the detecting illumination may further include inspecting one or more colors and tone parameters of the image of the face of the user. The tone parameters may represent brightness or darkness of a patch in an image. The dark tones may correspond to shadows whereas light tones may correspond to bright or highlight areas. Further, the normalizing colors of the image of the face of the user may include modifying one or more colors and tone parameters of the image of the face of the user.

Further, the method may include rendering the image of the face of the user in the user interface after normalization.

Further, the method may include receiving feedback of the user. Further, the method may include updating the image of the face of the user based on the feedback. For example, the user may wish to modify the overexposed areas of the image of the face of the user.

DETAILED DESCRIPTION OF THE DRAWINGS

FIG. 1 is an illustration of an online platform 100 consistent with various embodiments of the present disclosure. According to some embodiments, the present disclosure provides the online platform (a processing device) 100 for determining facial areas from an image 150 of a face of a user 110. The online platform 100 may be hosted on a centralized server 130, such as, for example, a cloud computing service. The centralized server 130 may communicate with other network entities, such as, for example, a communication device 120 (such as mobile phone, a smartphone, a laptop, a tablet computer etc.), servers (such as servers hosting social networking websites, blogs, forums etc.), and a database over a communication network 140, such as, but not limited to, the Internet. Further, users of the online platform 100 may include relevant parties such as, but not limited to, users, businesses, skin care product manufacturers, system administrators and so on. Accordingly, in some instances, electronic devices operated by the one or more relevant parties may be in communication with the online platform 100.

The user 110, such as the one or more relevant parties, may access the online platform 100 through a web-based software application or browser using the communication device 120. The web-based software application may be embodied as, for example, but not be limited to, a website, a web application, a desktop application, and a mobile application.

In step S1, the image 150 of a face of the user 110 is sent over the communication network 140 for analysis to the processing device (server 130 for example). In step S2, the results of the analysis are sent to the communication device 120. In step S3, the user 110 provides feedback on the analysis to the centralized server 130. The feedback is used to improve analysis of next time the user 110 or any other user accesses the online platform 100.

FIG. 2 is a flowchart for a method 200 for determining facial areas from an image 150 of a face of the user 110.

Figure 3:
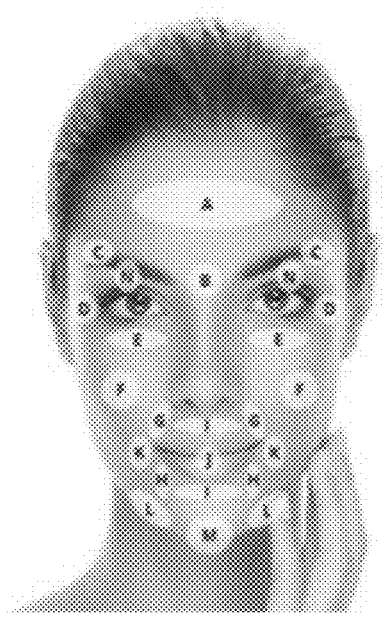
FIG. 3 is an illustration of an image of a face of a user marked with facial areas.

At 202, the method includes obtaining, using a processing device, a set of image analysis modules, wherein each of the image analysis modules trained to analyze different facial areas. FIG. 3 is an illustration of an image of a face of user with marked facial areas. For example, the different facial areas include one or more of forehead, glabella, temporal region, lateral canthal region, infraorbital area, cheeks, nasolabial folds, marionette lines, perioral lines, lips, oral commissures, jawline, chin and eye lashes.

Further at 204, the method includes receiving, from a communication device, the image 150 of the face of the user 110.

Further at 206, the method includes method includes receiving, from the communication device, an indication of a facial area of interest from the user 110.

Further at 208, the method includes selecting, using the processing device, from the set of image analysis modules an image analysis module associated with the indicated facial area of interest.

Further at 210, the method includes analyzing, using the processing device, the image 150 of the face of the user 110 to derive parameters related to the indicated facial area of interest using the selected image analysis module.

Figure 4A:
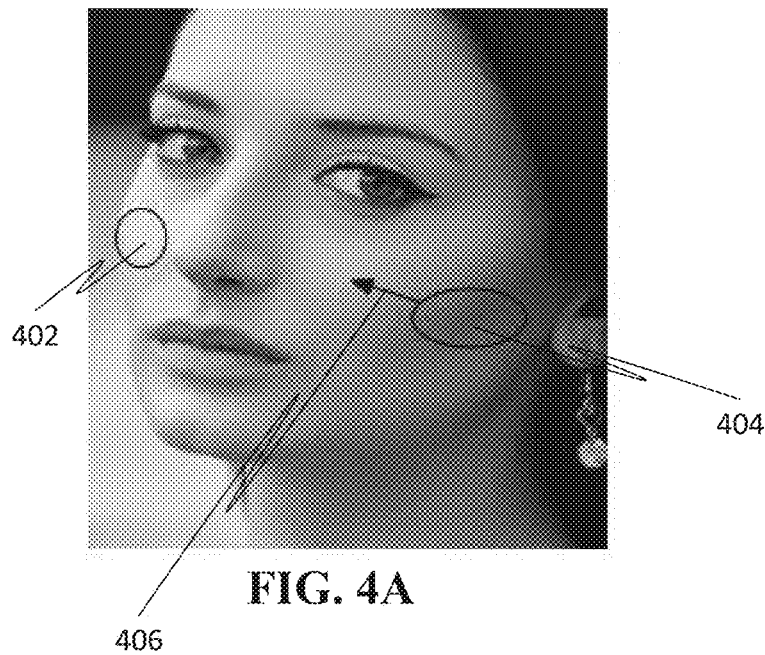
FIG. 4A illustrates indication of a found facial area with a graphic element.

Further at 212, the method includes rendering in a user interface of the communication device the image 150 of the face of the user 110 with an indication of the found facial area. For an instance, FIG. 4A illustrates indication of the found facial area (such as cheeks) by highlighting the found facial area with graphic elements, such as an oval graphic element 402 and an oval graphic element 404.

Figure 4B:
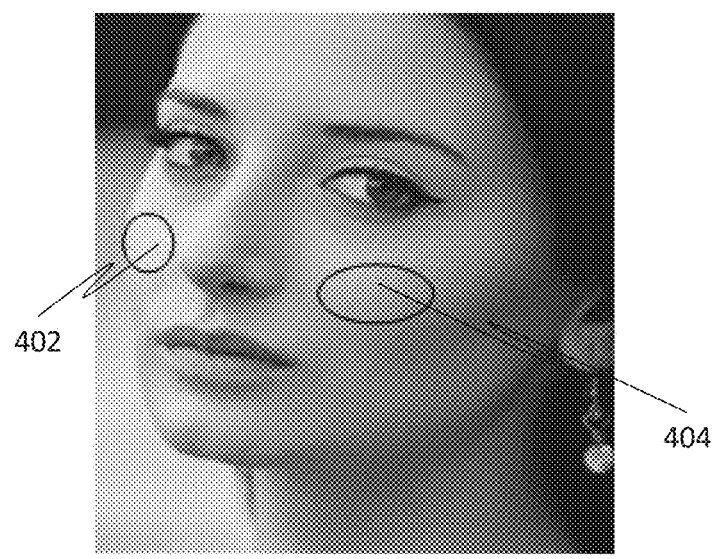
FIG. 4B illustrates indication new location of the found facial area with the graphic element.

Further at 214, the method includes receiving, from the communication device, a feedback with the user interface if the found facial area is indicated properly. For an instance, the user 110 provide feedback by modifying the location of the graphic element 404 in the direction of the arrow 406. Accordingly, the user 110 may drag the graphic element 404 to a new location as shown in FIG. 4B.

Further at 216, the method includes updating, using a processing device, the image analysis module based on the received feedback.

Figure 5:
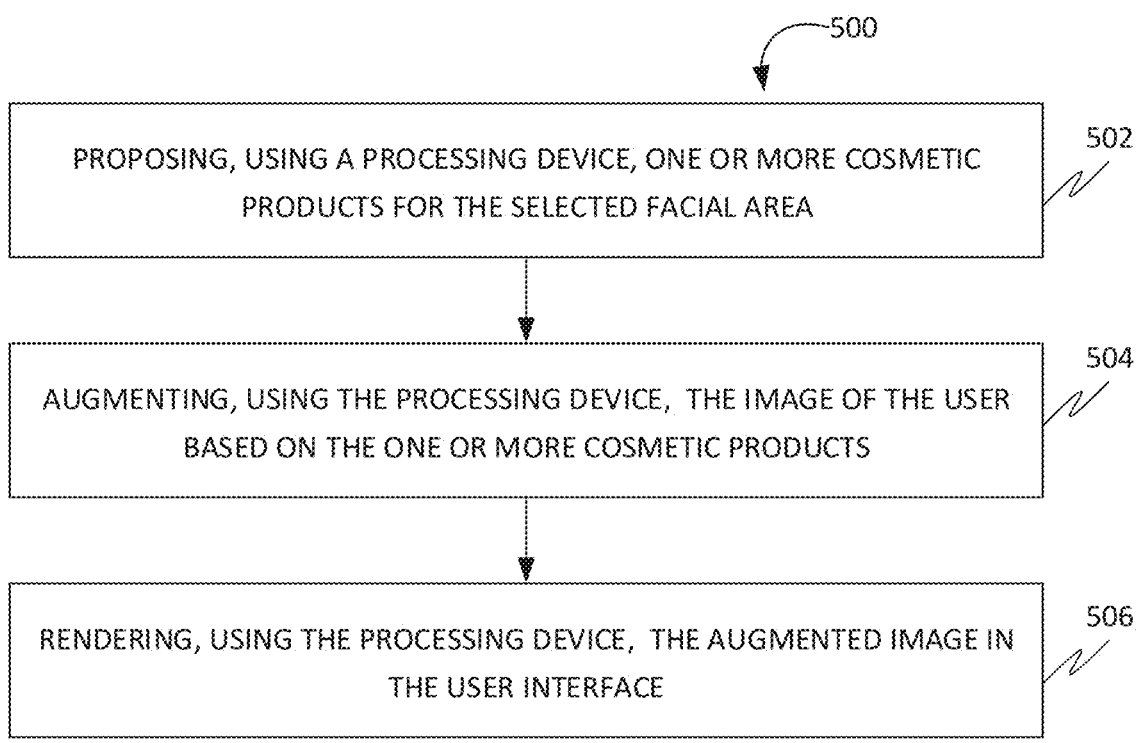
FIG. 5 is a flowchart of a method of recommending one or more cosmetic products for the selected facial area.

FIG. 5 is a flowchart for a method 500 for recommending one or more cosmetic products for the selected facial area.

Further, at 502, the method includes proposing, using a processing device, the one or more cosmetic products for the selected facial area.

Further, at 504, the method includes augmenting, using the processing device, the image 150 of the user 110 based on the one or more cosmetic products.

Further, at 506, the method includes rendering, using the processing device, the augmented image in the user interface.

Figure 6:
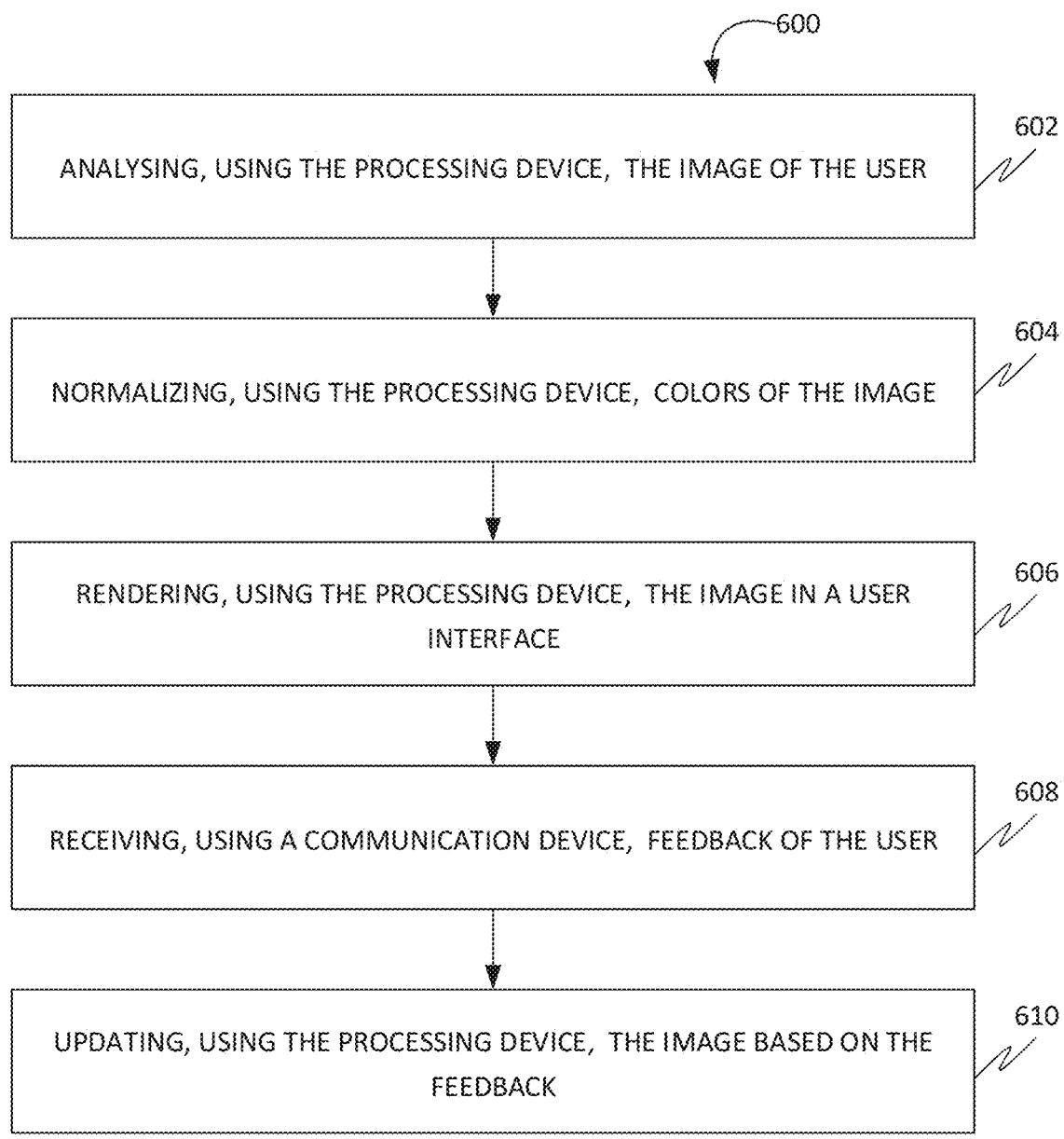
FIG. 6 is a flowchart of a method of enhancing the image of the face of the user.

FIG. 6 is a flowchart for a method 600 for enhancing the image 150 of the face of the user 110. The method includes analyzing the image 150 of the face of the user 110.

At 602, the method includes analyzing, using a processing device, the image 150 of the face of the user 110. Further, at 604, the method includes normalizing, using the processing device, colors of the image.

At 606, the method includes rendering, using the processing device, the image in a user interface. Further, at 608, the method includes receiving, using a communication device, feedback of the user 110.

Further, at 610, the method includes updating using the processing device, the image based on the feedback.

In some embodiments, the methods 200, 500 and 600 may be executed by the online platform 100.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of determining parameters related to facial areas from an image of a face of a user, the method comprising:

obtaining, using a processing device, a set of image analysis modules, wherein each of the image analysis modules trained to analyze different facial areas;

receiving, from a communication device, the image of the face of the user;

receiving, from the communication device, an indication of a facial area of interest from the user;

selecting, using the processing device, from the set of image analysis modules an image analysis module associated with the indicated facial area of interest;

analyzing, using the processing device, the image of the face of the user to derive a parameter related to the indicated facial area of interest using the selected image analysis module;

rendering in a user interface of the communication device an indication of the derived parameter;

receiving, from the communication device, a feedback with the user interface if the derived parameter is indicated properly; and updating, using the processing device, the image analysis module based on the received feedback;

wherein updating, using a processing device, the image analysis module based on the received feedback includes retraining the image analysis module based on the received feedback.

2. The method of claim 1, wherein the different facial areas include one or more of forehead, glabella, temporal region, lateral canthal region, infraorbital area, cheeks, nasolabial folds, marionette lines, perioral lines, lips, oral commissures, jawline, chin and eye lashes.

3. The method of claim 1, wherein image analysis modules in the set of image analysis modules, comprises artificial intelligence algorithms.

4. The method of claim 1, wherein image analysis modules in the set of image analysis modules, comprises machine learning classifiers trained using one or more training sets.

5. The method of claim 1, wherein the feedback may include the user modifying the indicator of the derived parameter related to facial area on the user interface.

* * * * *